(12) United States Patent
Chung

(10) Patent No.: US 6,937,276 B2
(45) Date of Patent: Aug. 30, 2005

(54) DIGITAL CAMERA WITH LOW MEMORY USAGE

(75) Inventor: Tzu-Chiang Chung, Taipei (TW)

(73) Assignee: BenQ Corporation, Tao-Yuan Hsien (TW)

( * ) Notice: Subject to any disclaimer, the term of this patent is extended or adjusted under 35 U.S.C. 154(b) by 641 days.

(21) Appl. No.: 09/682,343

(22) Filed: Aug. 22, 2001

(65) Prior Publication Data

US 2004/0201714 A1 Oct. 14, 2004

(51) Int. Cl.[7] .............................................. H04N 5/335
(52) U.S. Cl. .................................. 348/273; 348/222.1
(58) Field of Search ............................. 348/222.1, 272, 348/273, 280, 222

(56) References Cited

U.S. PATENT DOCUMENTS

| | | | |
|---|---|---|---|
| 5,016,107 A | | 5/1991 | Sasson et al. |
| 5,060,286 A | * | 10/1991 | Miller .......................... 382/239 |
| 5,204,756 A | * | 4/1993 | Chevion et al. ............. 382/239 |
| 5,541,653 A | * | 7/1996 | Peters et al. ................. 348/264 |
| 5,737,027 A | * | 4/1998 | Demos ......................... 348/474 |
| 5,818,524 A | | 10/1998 | Juen |
| 6,480,231 B1 | * | 11/2002 | Bernstein et al. ........... 348/448 |
| 2002/0003578 A1 | * | 1/2002 | Koshiba et al. ............. 348/273 |
| 2003/0117513 A1 | * | 6/2003 | Anderson ................. 348/333.11 |

FOREIGN PATENT DOCUMENTS

JP          59-070091          4/1984

* cited by examiner

Primary Examiner—Tuan Ho
Assistant Examiner—Heather R. Long
(74) Attorney, Agent, or Firm—Winston Hsu

(57) ABSTRACT

A digital camera has an image sensor system, a first compression system, a frame buffer, a first decompression system, and an image processing system. The image sensor system provides n pixels of initial image information. The n pixels each have m bits of intensity information of one color from three component colors. The initial image information is thus n×m bits in size. The first compression system compresses the n×m bits of the initial image information into r bits of secondary image information. The frame buffer is at least r bits in size for storing the secondary image information. The first decompression system decompresses the r bits stored in the frame buffer to provide tertiary image information. Finally, the image processing system accepts the tertiary image information to generate processed image information. The pixels of the processed image information each have intensity information for each color of the three component colors.

9 Claims, 6 Drawing Sheets

DIGITAL CAMERA WITH LOW MEMORY USAGE

BACKGROUND OF INVENTION

1. Field of the Invention

The present invention relates to a digital camera. In particular, the present invention discloses a digital camera that has low memory requirements for a frame buffer.

2. Description of the Prior Art

Enormous advances in digital electronics over the past year have resulted in more and more consumers switching over from traditionally analog devices to their digital equivalents. A particularly relevant example of this is the digital camera, which is rapidly replacing film-based cameras. Digital cameras enable a user to preview a frame, and to select those frames that are to be kept, while discarding unwanted frames. This offers a great advantage over the previous incarnation of film-based cameras, in which the frames were inerasably caught within the emulsion of the film, and which could not be viewed until the film was developed often many weeks or months after the frame itself was taken.

Please refer to FIG. 1 and FIG. 2. FIG. 1 is a flow chart for a prior art digital camera. FIG. 2 is a partial block diagram of an optical sensor 20. The prior art digital camera utilizes an image sensor system 2 to capture a single image frame. The image sensor system 2 is itself quite complex, including many components, such as lenses, an aperture diaphragm, etc. In particular, though, at the heart of the image sensor system 2 lies the optical sensor 20. The optical sensor 20 is typically a CCD or CMOS device, and serves as the "film" for the digital camera. The optical sensor 20 comprises a plurality of pixel sensors 22 arranged along a plurality of rows 20r and columns 20c. A typical optical sensor 20 may support over two million pixels 22, enabling corresponding row 20r and column 20c dimensions of about 1400×1400 pixels (the so-called resolution of the optical sensor 20). To provide full-color capabilities, the optical sensor 20 must provide color information for at least three colors, which form a component color set. The most commonly used component color set is a set of the three complementary colors red, green and blue. Other sets are possible, though, such as a set of the four colors cyan, yellow, magenta and green. The optical sensor 20 is shown utilizing the more common component color set of red, green and blue. Each pixel sensor 22 is capable of providing intensity information for only one of the three colors red, green and blue. Eight bits (one byte) of intensity information is typically provided by each pixel sensor 22. Consequently, the pixel sensors 22 may be broken into interleaved subcategories: red pixel sensors 22r, green pixels sensors 22g and blue pixel sensors 22b. The green pixel sensors 22g predominate, as the human visual system is most sensitive to the color green. Each red pixel sensor 22r provides one byte of intensity information for red. Each green pixel sensor 22g provides one byte of intensity information for green, and each blue pixel sensor 22b provides one byte of intensity information for blue. For a two mega-pixel optical sensor 20, raw image frame data will have a total size of two mega-pixels*1 byte/pixel=two megabytes. For each picture taken by a user, the image sensor system 2 thus generates two megabytes of raw image frame data.

A pre-processing unit 4 is used to provide each byte of data from a pixel sensor 22 (a so-called pixel) with color information from the other component colors, so that each pixel, after pre-processing, will have 3 bytes of color information: a byte for red intensity information, another for green, and yet another for blue 24 bits in total. The pre-processing system 4 utilizes pixel sensors 22 adjacent to a target pixel sensor 22 to calculate intensity values for the other component colors of the target pixel sensor 22. For example, consider a red pixel sensor 24r. There are eight pixel sensors 22 adjacent to the red pixel sensor 24r, which include green pixel sensors 24g and blue pixel sensors 24b. The target pixel sensor 24r physically detects and provides 8 bits of red intensity information to the pre-processing system 4. Similarly, each adjacent green pixel sensor 24g provides 8 bits of green intensity information, and each adjacent blue pixel sensor 24b provides 8 bits of blue intensity information. All of this color intensity information is used by the pre-processing unit 4 to generate an additional 16 bits of color information for the target pixel sensor 24r: 8 bits of blue, and 8 bits of green. The pre-processing system 4 thus creates full image frame data from the raw image frame data. Whereas the raw image frame data is two megabytes in size, the full image frame data coming from the pre-processing system 4 is 6 megabytes in size.

A frame buffer 10 is used to buffer and store complete image frame information. The frame buffer 10 must be large enough to hold at least one complete image frame 10f. Six megabytes of full image frame data, however, is a lot of data to handle and store. In order to reduce the memory size requires of the frame buffer 10, a high-speed compression system 6 is used to compress the full image frame data received from the pre-processing system 4. For data integrity, the high-speed compression system 6 is ideally a lossless, or near-lossless, compression system. Differential pulse coded modulation (DPCM), in conjunction with Huffman encoding, is a standard algorithm used by the high-speed compression system 6. DPCM is basically a stream of difference values derived from differences between components in a stream of data (i.e., differences in color intensity information in the data stream from the pre-processing system 4). As image data tends to be smoothly varying, these difference values require fewer bits for encoding than actual color intensity values, and tend to have a zero-sum mean, which is ideally suited for Huffman encoding. Compression ratios of 50% are generally obtained by the high-speed compression system 6. Each frame 10f within the frame buffer 10 is thus not actual full image frame data, but is instead compressed frame data derived from the full image frame data. Rather than requiring at least 6 megabytes of memory per frame 10f, the frame buffer 10, with the help of the high-speed compression system 6, can instead use but 3 megabytes of memory per frame 10f. Component costs are reduced accordingly.

A decompression system 14 is used to restore the compressed frame data in a frame 10f back into full image frame data, which is then fed into a lossy compression system 16. Lossy compression systems 16, as the name implies, tend to irrecoverably lose image information, but offer exceptional compression ratios. Such lossy compression systems 16 are designed, however, to "lose" information in such a way as to be undetectable, or nearly undetectable, by the human visual system. The JPEG compression standard is the most commonly used lossy compression algorithm for digital cameras. The lossy compression system 16 thus accepts full image frame data from the de-compression system 14 to generate JPEG image data, which is then permanently stored in non-volatile memory 18.

Getting digital cameras to market at a price that is affordable to the average consumer is of the utmost importance to manufacturers. Many tools and devices are used to bring component costs down. One such tool is the so-called system-on-a-chip (SOC) component. In effect, every integrated circuit required for the flow chart of FIG. 1 is placed onto a single silicon device, with the possible exceptions of the image sensor system 2 and the non-volatile memory 18. By far, the greatest cost associated with such an SOC design is the frame buffer 10. If the memory size requirements of the frame buffer 10 can be reduced, considerable savings may be achieved, with a correspondingly less expensive digital camera being brought to market.

SUMMARY OF INVENTION

It is therefore a primary objective of this invention to provide a digital camera that has reduced memory size requirements for a frame buffer.

Briefly summarized, the preferred embodiment of the present invention discloses a digital camera with an image sensor system, a first compression system, a frame buffer, a first decompression system, and an image processing system. The image sensor system provides n pixels of initial image information for an image. Each of the n pixels has m bits of intensity information for only one color selected from a group of at least three component colors so that the initial image information is n×m bits in size. The first compression system compresses the n×m bits of the initial image information into r bits of secondary image information. The frame buffer is at least r bits in size for storing the secondary image information. The first decompression system decompresses the r bits stored in the frame buffer to provide tertiary image information. Finally, the image processing system accepts the tertiary image information to generate processed image information. The processed image information has a plurality of pixels, with each pixel having intensity information for each color in the group of at least three component colors.

It is an advantage of the present invention that by performing color interpretation for each pixel after the initial image information is compressed and stored in the frame buffer, the memory size requirements of the frame buffer are reduced by a third. The memory requirements of the frame buffer can thus be correspondingly reduced, which leads to less expensive component costs.

These and other objectives of the present invention will no doubt become obvious to those of ordinary skill in the art after reading the following detailed description of the preferred embodiment, which is illustrated in the various figures and drawings.

DETAILED DESCRIPTION

Figure 3:
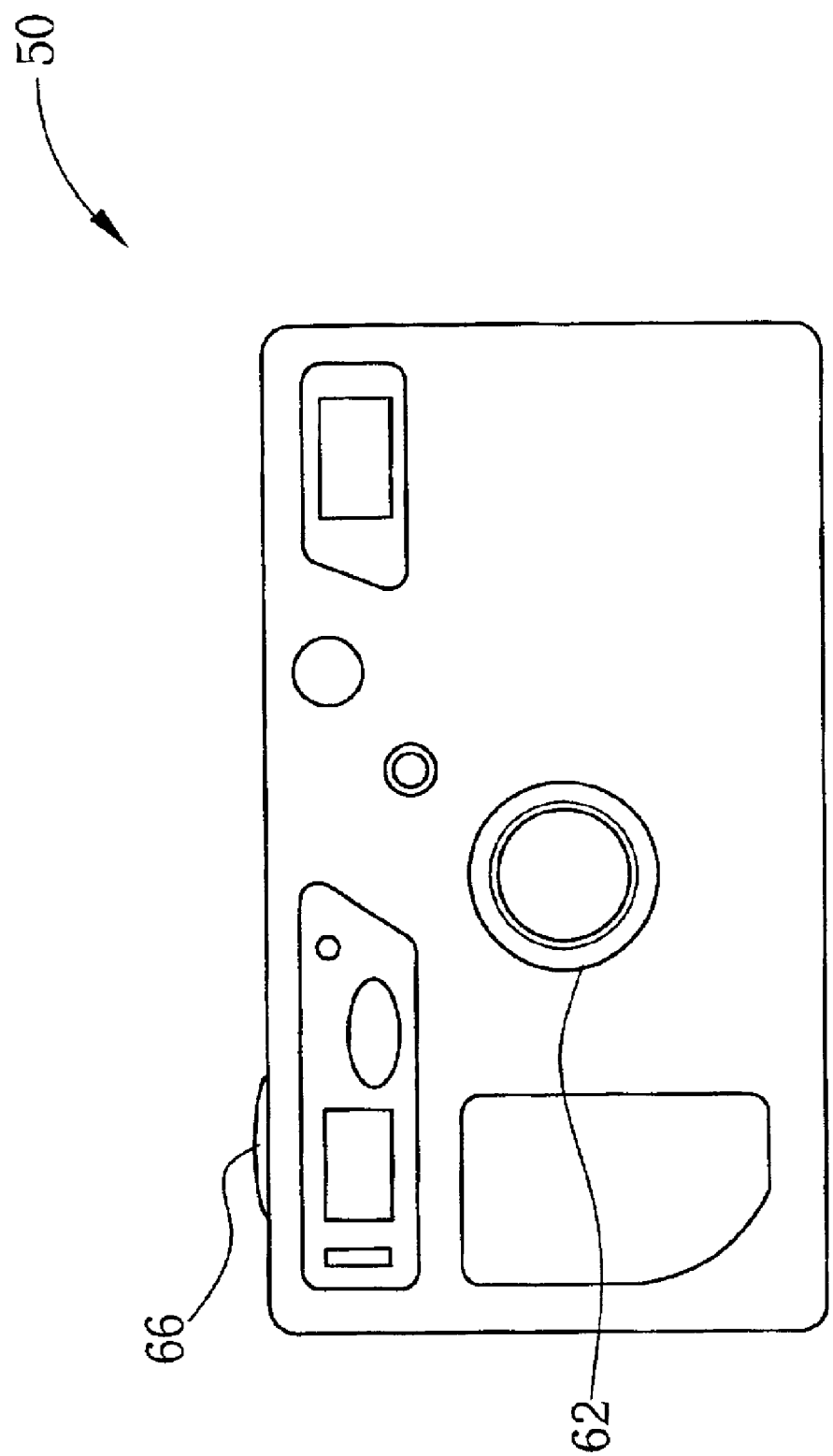
FIG. 3 is a perspective view of a digital camera according to the present invention.
Figure 4:
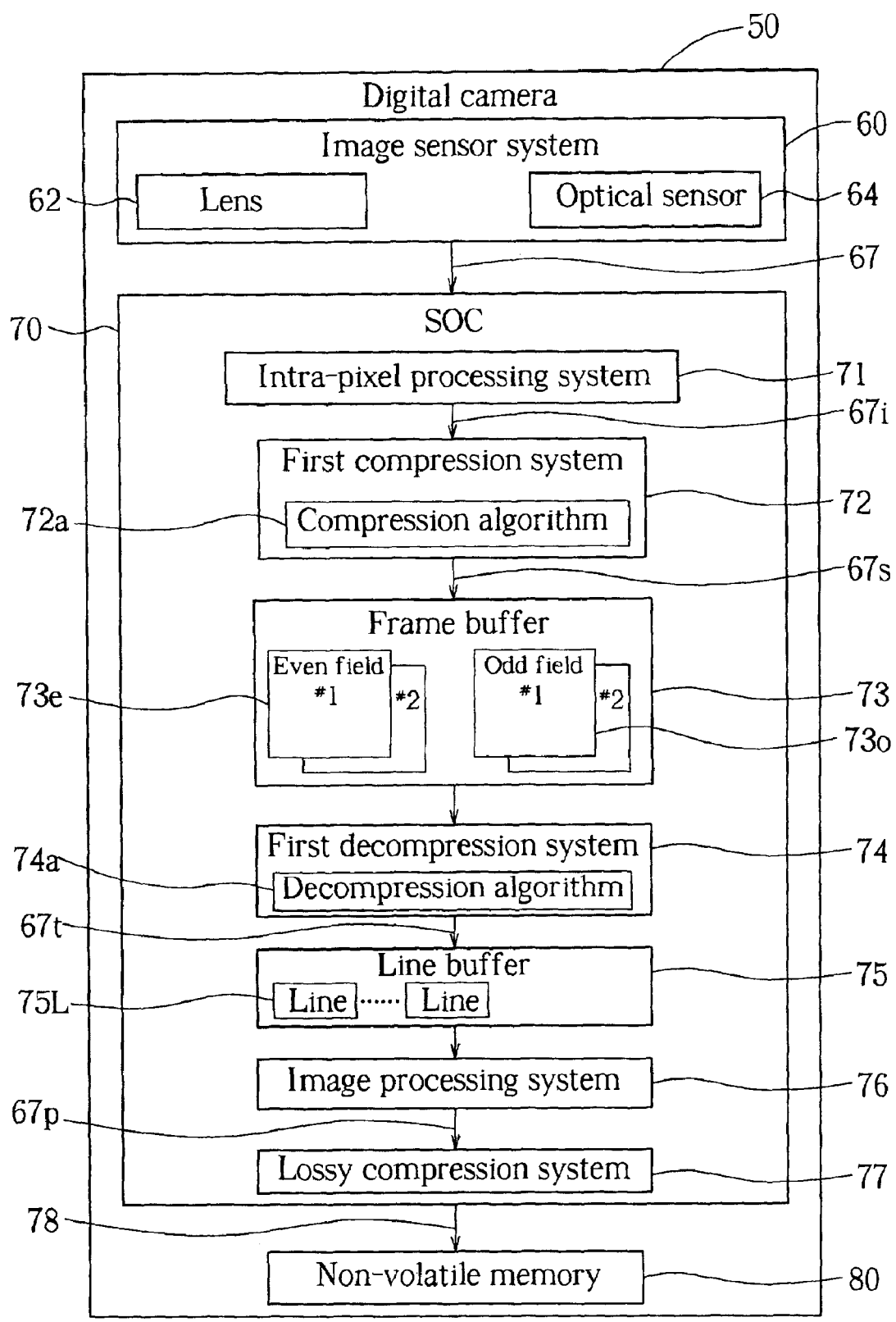
FIG. 4 is a block diagram of the digital camera shown in FIG. 3.

Please refer to FIG. 3 and FIG. 4. FIG. 3 is a perspective view of a digital camera 50 according to the present invention. FIG. 4 is a block diagram of the digital camera 50 shown in FIG. 3. The digital camera 50 comprises an image sensor system 60, a system-on-a-chip (SOC) 70, and non-volatile memory 80. The non-volatile memory 80 may be, for example, a plug-in memory card such as floppy disk, CF (compact flash) card, SONY memory stick, IBM microdrive, or built-in flash memory such as $E^2$ PROM. The image sensor system 60 includes a lens 62 and an optical sensor 64. The lens 62 is used to focus an image onto the optical sensor 64. The optical sensor 64 serves as the "film" of the digital camera, and may be a CCD or CMOS device. The present invention is particularly well suited for interlaced CCDs, and so in the following it is assumed that the optical sensor 64 is an interlaced CCD. Upon the pressing of a shutter release button 66, the SOC 70 accepts streaming interlaced raw image information 67 corresponding to an image incident on the optical sensor 64 from the lens 62. The SOC 70 processes the raw image information 67 from the optical sensor 64 and stores compressed image information 78 into the non-volatile memory 80 that corresponds to the image incident on the optical sensor 64. In short, by pressing the shutter release button 66, a picture is taken that is then stored in the non-volatile memory 80. It is the job of the SOC 70 to get the data from the optical sensor 64 into a proper format for the non-volatile memory 80.

Figure 1:
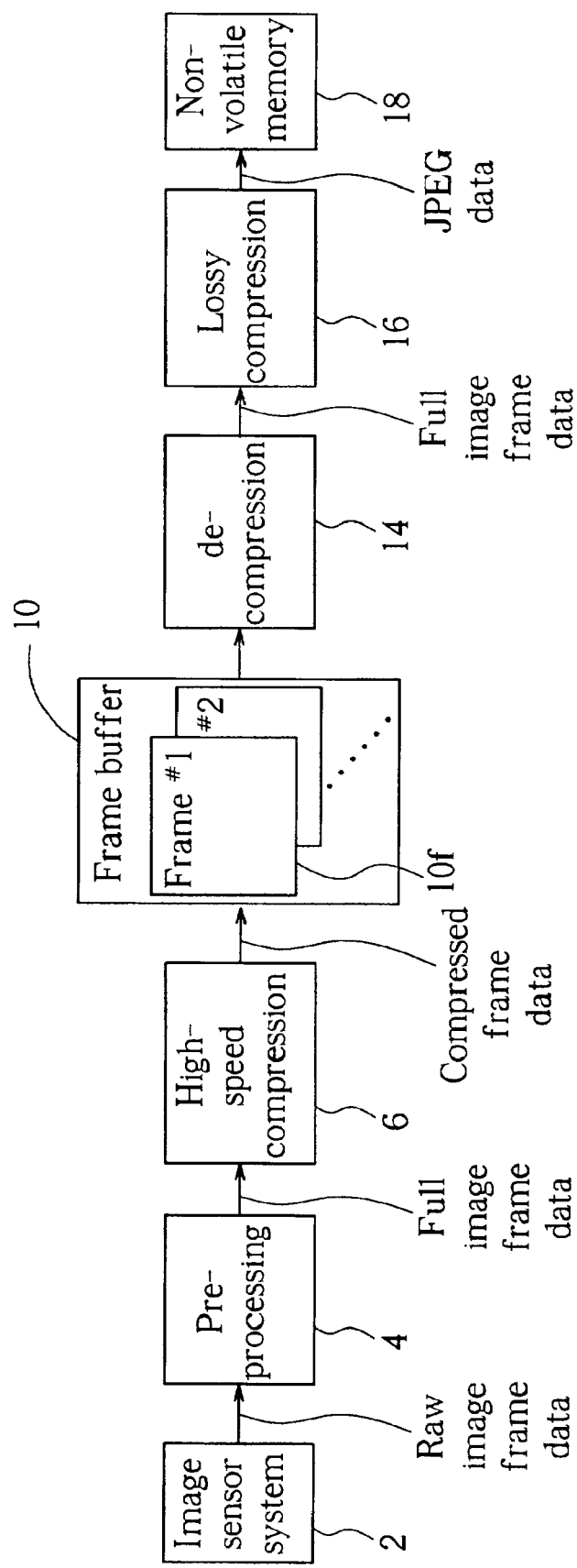
FIG. 1 is a flow chart for a prior art digital camera.
Figure 2:
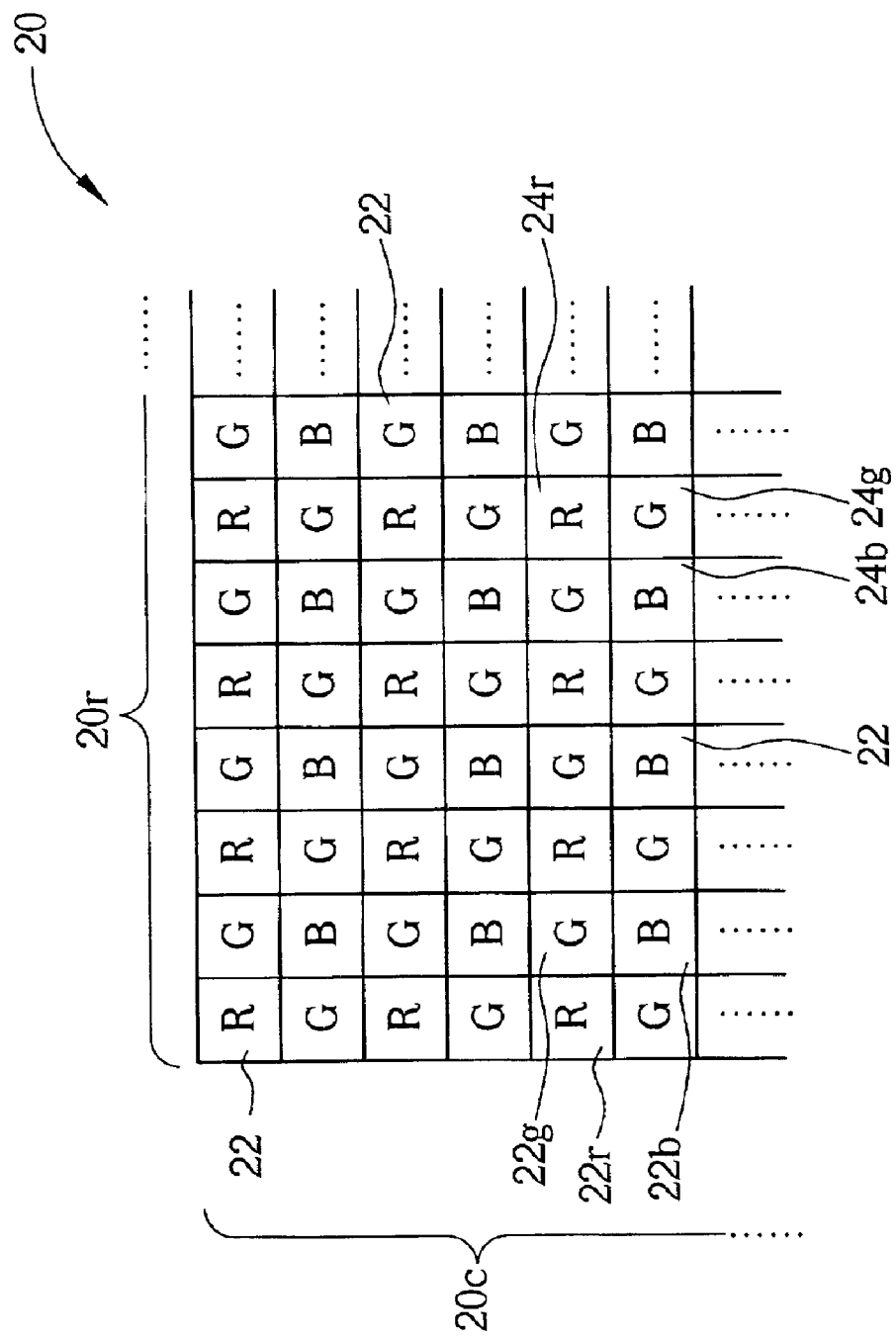
FIG. 2 is a partial block diagram of an optical sensor.
Figure 5:
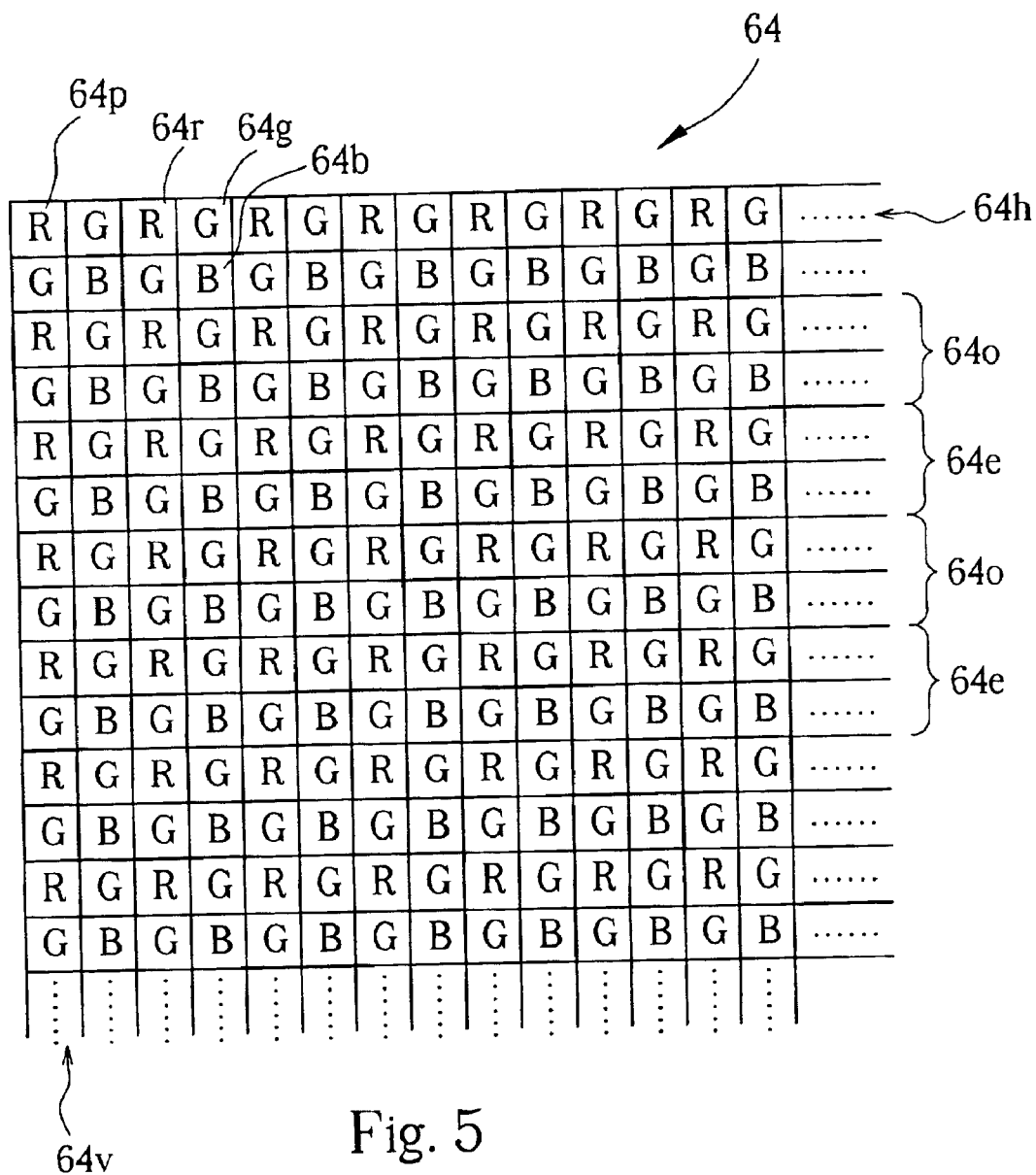
FIG. 5 is a block diagram of an optical sensor depicted in FIG. 4.

Please refer to FIG. 5 in conjunction with FIGS. 3 and 4. FIG. 5 is a block diagram of the optical sensor 64. The operational characteristics of the sensor 64 are identical to those described for the optical sensor 20 of FIG. 2 in the Description of the Prior Art. In particular, the optical sensor 64 comprises n pixel sensors 64p arrayed in a plurality of horizontal rows 64h and vertical columns 64v. A typical optical sensor 64 may be a two mega-pixel interlaced CCD, so that n has a value of about $2^{21}$. Each pixel sensor 64p provides m-bits of intensity information for only one color selected from a group of at least three component colors. In the example depicted in FIG. 5, the group of three component colors consists of red, green and blue. No other colors are required. It is further assumed that the value of m is 8. The optical sensor 64 thus has a plurality of red pixel sensors 64r that each develop 8 bits of red intensity information, a plurality of green pixel sensors 64g that each develop 8 bits of green intensity information, and a plurality of blue pixel sensors 64b that each develop 8 bits of blue intensity information. After the shutter release button 66 is pressed, the pixel sensors 64p generate a total of n×m bits of raw image information 67, which, for the present example, would be about two megabytes of raw image information 67.

The raw image information 67 streams into the SOC 70 and is first delivered to an intra-pixel processing system 71. The intra-pixel processing system 71 performs any corrections to the raw image information 67 that does not require that each pixel (i.e., data from a pixel sensor 64) have color intensity information for all of the three component colors red, green and blue. This may include white balance control, and gamma correction. As the intra-pixel processing system 71 neither adds data to, nor removes data from, the raw image information 67, the intra-pixel processing system 71 thus also generates n×m bits of initial image information 67i, i.e., two megabytes of initial image information 67i. Because the intra-pixel processing 71 performs such low-level processing of the intensity information from the pixel sensors 64p, it is possible that the intra-pixel processing system 71 may be located directly on the optical sensor 64. For purposes of the following discussion, the intra-pixel processing system 71, though on the SOC 70, may be thought of as part of the image sensor system 60, which consequently generates the initial image information 67i.

The initial image information 67i is passed from the intra-pixel processing system 71 to a first compression system 72. The first compression system 72 ideally utilizes a lossless, or near-lossless, compression algorithm 72a. A lossless compression algorithm 72a compresses initial data in such a manner that the initial data may be completely and identically restored by a corresponding decompression algorithm. A near-lossless compression algorithm may not enable identical restoration of the initial data, but the restored data should be effectively identical to the initial data for all practical intents; i.e., only least significant bits (LSBs) may occasionally be flipped in the component color intensity data. Several such lossless and near-lossless compression algorithms 72a are known in the art. The present invention utilizes DPCM with Huffman encoding as the compression algorithm 72a, as discussed in the Description of the Prior Art. In any event, the compression algorithm 72a must be capable of working at high-speeds so that no buffering of the initial image information 67i streaming in from the intra-pixel processing system 71 is required. The first compression system 72 utilizes the high-speed compression algorithm 72a to generate r bits of secondary image information 67s from the initial image information 67i. Of course, for the first compression system 72 to have any useful effect, r must be less than n×m. That is, the secondary image information 67s must be smaller in size than the initial image information 67i. The compression algorithm 72a will typically afford compression ratios of 50%, so that the two megabytes of initial image information 67i generates but one megabyte of secondary image information 67s. The value of r is thus about half that of n×m. This secondary image information 67s is then stored in a frame buffer 73.

For the frame buffer 73 to properly store the secondary image information 67s, the frame buffer 73 must have a memory size of at least r bits, and ideally a size that is at least slightly larger than r bits to accommodate for any variations in the compression ratios of the initial image information 67i from the compression algorithm 72a. For this example, then, the frame buffer 73 should be at least one megabyte in size. As discussed previously, for the present example it is assumed that the optical sensor 64 is an interlaced CCD 64. Internally, the optical sensor 64 groups the rows 64h into even rows 64e that alternate with odd rows 64o. The optical sensor 64 first streams out all of the raw image data 67 from even rows 64e, and then streams out all of raw image data 67 from all of the odd rows 64o. As the first compression system 72 compresses the initial image information 67i "on the fly", two distinct frames of secondary image data are generated for one complete frame of initial image information 67i: an even field 73e, and an odd field 73o. The even field 73e contains secondary image information 67s for the even rows 64o, whereas the odd field 73o contains secondary image information 67s for the odd rows 64o. The even field 73e together with the odd field 73o thus contain the total secondary image information 67s. The frame buffer 73 may be designed to hold a plurality of frames of secondary image information 67s, in which case the frame buffer 73 would be capable of holding a plurality of even frames 73e and an equal number of corresponding odd frames 73o. In this case, the minimum memory size requirements for the frame buffer 73 would be r×x, where x is the number of frames of secondary image information 67s that are to be stored in the frame buffer 73. Using the present example, if four frames are to be stored in the frame buffer 73, then the frame buffer 73 would have to be at least four megabytes in size.

A first decompression system 74 is used to decompress the secondary image information 67s stored in the even frame 73e and odd frame 73o to generate tertiary image information 67t. The first decompression system 74 utilizes a decompression algorithm 74a that is the inverse of the compression algorithm 72a. Consequently, if the compression algorithm 72a offers lossless functionality, then the tertiary image information 67t will be identical to the initial image information 67i. On the other hand, if the compression algorithm 72a offers near-lossless functionality, then the tertiary information 67t may not be identical to the initial image information 67i, but will be effectively so for all practical purposes. In any event, the tertiary image information 67t will, like the initial image information 67i, have n×m bits of data. Consequently, each pixel of data in the tertiary image information 67t has m bits (i.e., 8 bits) of color intensity information for only one of the three component colors (i.e., red, green or blue).

A line buffer 75 is used to de-interlace the tertiary image information 67t. The line buffer 75 comprises a plurality of lines 75L, such as ten lines 75L. Each line 75L corresponds to tertiary image information 67t for one row 64h of pixels from the initial image information 67i. As an example, the first decompression system 74 provides to the line buffer 75 tertiary image information 67t derived from the first even field 73e corresponding to five successive even rows 64e, and tertiary image information 67t derived from the first odd field 73e corresponding to five successive odd rows 64o. The line buffer 75 stores the tertiary image information 67t in the lines 75L in an alternating fashion (i.e., an even line 75L of tertiary image information 67t, followed by an odd line 75L), so as to de-interlace the tertiary image information 67t. Note that if the digital camera 50 is to support a digital zoom function, then the lines 75L will need to have a pixel width that exceeds the number of pixel sensors 64p on each horizontal row 64h of the optical sensor 64. The line buffer 75 is also used to provide a serialized block of tertiary image information 67s to an image processing system 77, which will be discussed below.

The image processing system 76 is used to generate n pixels of processed image information 67p from the tertiary image information 67t as received from the line buffer 75 in the form of serialized blocks of tertiary image information 67s. For the present example, n would be two mega-pixels, corresponding to the two mega-pixels of tertiary image information 67s derived from the two mega-pixels of initial image information 67i. Each pixel in the processed image information 67p has image intensity information for each of the component colors. For this example, each pixel in the processed image information 67p would have 24 bits of color information: 8 bits for red, 8 bits for green and 8 bits for blue. Other arrangements are possible, however, such as providing more bits for green, fewer for red, and fewer still for blue, or utilizing chrominance and luminance encoding, as, for example, per the ITU-R industry standard. Regardless of the encoding method used for the pixels in the processed image information 67p, each pixel will distinctly contain intensity information for the three component colors. This is in contrast to the initial image information 67i, wherein each pixel contains intensity information for only one of the component colors. Consequently, the primary function of the image processing system 76 is to generate and properly encode the intensity information for the other component colors within each pixel of the tertiary image information 67s.

Figure 6:
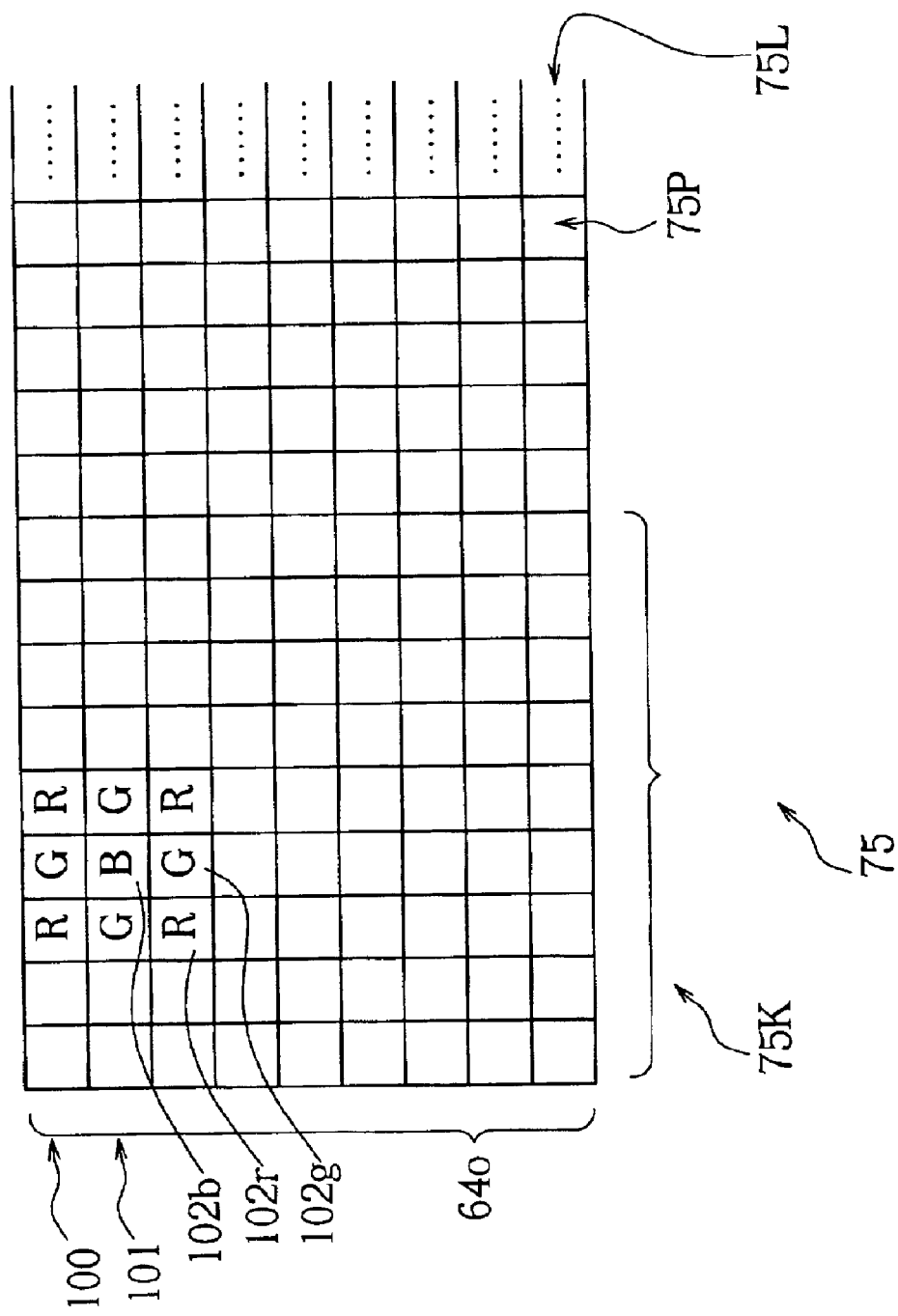
FIG. 6 is a block diagram of a line buffer depicted in FIG. 4.

Please refer to FIG. 6 in conjunction with FIGS. 4 and 5. FIG. 6 is a block diagram of the line buffer 75. For the present example, it is assumed that the line buffer 75 contains ten line 75L, each containing a plurality of pixels 75p that matches, or exceeds, the number of pixel sensors 64p in a row 64h of the optical sensor 64. The color intensity information for each pixel 75p should be equal, or effectively equal, to the corresponding color intensity information in the initial image information 67i. A block of 10×10 pixels 75k is provided by the line buffer 75 to the image processing system 76 in a serialized stream 67s. That is, ten pixels 75p are streamed out in order from a first row 100 in the block 75k, followed by ten pixels 75p, in order, in a subsequent row 101, etc., until all of the pixels 75p within the block 75k have been delivered to the image processing system 76. This is termed serializing a block of data, and is one of the functions of the line buffer 75. For each pixel 75p in the serialized tertiary information 67s, the image processing system 76 considers all pixels 75p adjacent to that pixel 75p to provide the pixel 75p with the intensity information from the other component colors. For example, a blue pixel 102b within the block 75k of serialized tertiary information 67s, will have four adjacent red pixels 102r and four adjacent green pixels 102g. Each pixel 102r, 102g and 102b has only 8 bits of intensity information for its respective color. The image processing system 76 considers the adjacent red and green pixels 102r and 102g to generate a corresponding pixel in the processed image information 67p that has intensity information for both red and green, as well as blue. The simplest example, as discussed above, is to provide the corresponding pixel in the processed image information 67p with 24 bits of color intensity information: 8 for red, 8 for green and 8 for blue. Of course, other color encoding methods are possible. Besides color interpolation, the image processing system 76 may also perform other functions, such as image enhancement.

The processed image information 67p is then streamed into a lossy compression system 77. Lossy compression, such as a JPEG compression scheme, is used within the lossy compression system 77 to generate compressed image information 78 to the non-volatile memory 80 for permanent storage. Lossy compression is used as it offers exceptional compression ratios for a slight trade-off in image quality, and thus enables more frames to be stored in the non-volatile memory 80. In the preferred embodiment, the lossy compression system 77 utilizes the JPEG standard for compression. The JPEG compression standard is a block-based lossy compression scheme, which works on an 8×8 block of pixels. The line buffer 75 thus must have at least 8 lines 75L to provide a sufficiently large serialized block of pixels 75k. That is, the pixel dimensions of the block 75k must be at least as large as the block size requirements of the lossy compression system 76. As noted above, the line buffer 75 will actually have 10 or more lines 75L to provide a sufficiently large block 75k to both the image processing system 76 and the lossy compression system 77, having pixel dimensions of 10×10 or more in size. As the block 75k is serialized by the line buffer 75, no block-to-serial conversion is needed for the JPEG compression in the lossy compression system 77. This helps to ease the implementation of block-based compression schemes in the lossy compression system 77. Although block-based compression schemes are preferred for the lossy compression system 77, they certainly are not required. A raster-based compression scheme could also be utilized. In this case, the block 75k would comprise three or more full lines 75L, which would be serialized in order, a line 75L at a time. Providing at least three lines 75L enables the image processing system 76 to perform color interpolation.

In contrast to the prior art, the present invention performs the image processing that generates the extra color information for each pixel after the raw image data received from the optical sensor is compressed and stored in the frame buffer. The compressed raw image data in the frame buffer thus has intensity information for only one color for each pixel, which reduces the memory size requirements of the frame buffer by a third. The addition of line buffers after the frame buffer help to serialize the processed image information, so that that the lossy compression system does not need to serialize the processed image information, which eases the implementation of the lossy compression system.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for processing images using a digital camera, comprising:
   capturing n pixels of raw image information, each pixel having m bits of intensity information for only one color selected from a group of at least three component colors so that the raw image information comprises n×m bits;
   processing the raw image information into initial image information based on the intensity information of the selected color and not based on the intensity information of other component colors, the initial image information comprising n×m bits;
   compressing the n×m bits of the initial image information into r bits of secondary image information, wherein r is less than n×m;
   storing the secondary image information in a frame buffer of at least r bits;
   decompressing the r bits stored in the frame buffer to provide tertiary image information; and
   processing the tertiary image information to generate processed image information comprising a plurality of pixels, each pixel of the processed image information providing intensity information for each color in the group of at least three component colors.

2. The method of claim 1 wherein the initial image information consists of n×m bits.

3. The method of claim 2 wherein the tertiary image information consists of n×m bits.

4. The method of claim 1 further comprising storing a plurality of lines of the tertiary image information and processing at least one block of serialized tertiary image information.

5. The method of claim 4 wherein the raw image information is captured using an interlaced sensor system, and storing the plurality of lines of the tertiary image information comprises de-interlacing the tertiary image information.

6. The method of claim 4 further comprising compressing a block of processed image information to provide compressed image information to a permanent storage system of the digital camera.

7. The method of claim 6 wherein the block of serialized tertiary image information has corresponding pixel dimensions that are at least as large as pixel dimension requirements of the block of processed image information.

8. The method of claim 4 further comprising utilizing a raster-based image compression system for compressing the initial image information to provide compressed image information to a permanent storage system of the digital camera.

9. The method of claim 1 wherein compressing the initial image information comprises utilizing a lossless compression algorithm so that the tertiary image information is identical to the initial image information.

* * * * *